W. C. GRIMES.
Water and Steam Indicator.
No. 21,468. Patented Sept. 7, 1858.
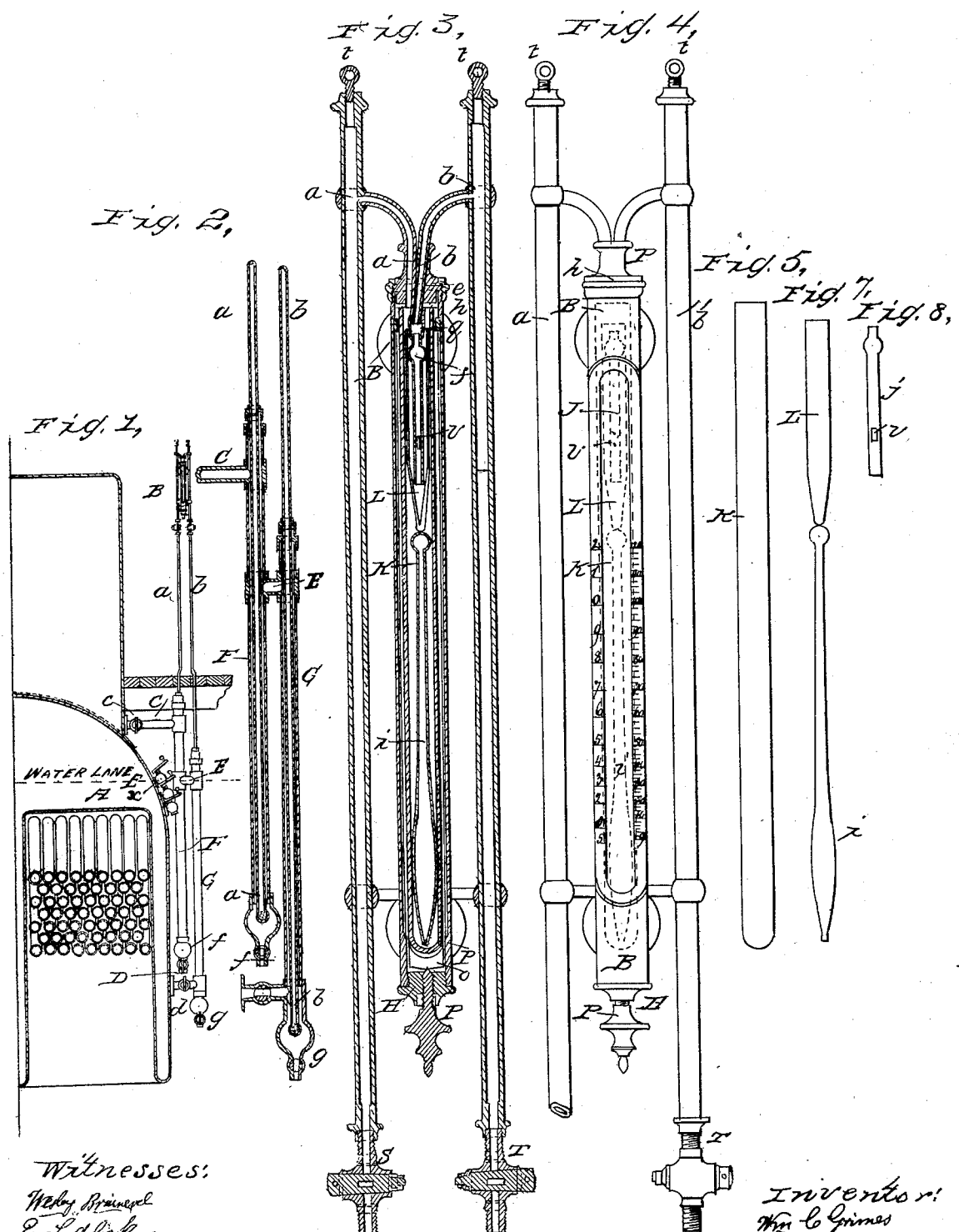

UNITED STATES PATENT OFFICE.

WM. C. GRIMES, OF PHILADELPHIA, PENNSYLVANIA, ASSIGNOR TO DAVID MATTHEW, OF SAME PLACE.

STEAM-PRESSURE AND WATER INDICATOR.

Specification of Letters Patent No. 21,468, dated September 7, 1858.

*To all whom it may concern:*

Be it known that I, WM. C. GRIMES, of Philadelphia, and State of Pennsylvania, have invented a new and useful Improvement in Water and Steam Indicators for Steam-Boilers; and I do declare that the following is a full and exact description thereof, reference being had to the accompanying drawings and the letters of reference marked thereon.

The nature of my invention consists in the manner of constructing, and arranging two or more concentric glasses, so that one or more forms a reservoir for mercury, and a descending column, while one or more of the inner forms a central, and rising column, so that, the reading scale, shall be from top of the sinking column of mercury in the outer concentric glass, to the top, of the rising column in the inner concentric glass, indicating, the fall and rise of the water, in the boiler, and its distance below, water line; thereby indicating, the fall and rise of the column of mercury as in a common bent siphon gage; giving scale of mercury, as the specific gravity, of the mercury, is to that of water, so is the fall of water in boiler to the fall and rise of mercury in the concentric glasses; also in the manner, of constructing, and arranging the connecting pipes with the boiler and in connecting the two column or concentric pipes, for the purpose of forming an equilibrium, and discharge, for surplus water either from condensation, or the flow of water through the opposing column or pipe, at the fixed water line of the boiler.

To enable others skilled in the art to make, and use my invention, I shall proceed to describe its construction, and operation, reference being had, to the accompanying drawings, forming part of this specification, in which similar letters, in different figures, indicate like parts and in which, Figure 1, is a front elevation showing section of boiler, concentric pipes, and indicator. (Scale ½ inch to a foot.) Fig. 2, is a front elevation of concentric connecting pipes, shown in section, scale one inch to a foot; Fig. 3, is a front elevation of indicator, shown, in section, (half size.) Fig. 4, is a front view of the indicator, (half size.) Fig. 5, is a view of outer concentric glass removed, (half size.) Fig. 6, is a view of lower and inner concentric glass removed, (half size.) Fig. 7, is a view of the outer concentric glass for water indicator, and central glass when combined with steam, removed; (half size.) Fig. 8 is view of the inner, and upper concentric glass, of the water indicator, removed, (half size.)

A is the boiler, B the instrument case, C upper connecting branch to the boiler, D the lower connecting branch to the boiler.

E is middle connecting branch between the two concentric pipes at the level or plane of water line of boiler.

F is the outer concentric pipe with C and E attached to it, $a$ passing down through its center near to its bottom.

G is outer concentric pipe with E connected near to its top, and D near to its bottom, with $b$ passing down through from its top near to its bottom.

$f$ is blow off cock at the bottom of F, and $g$ is blow off cock for G.

$c$ is a stop cock for C at boiler, and $d$ is stop cock for D, at the boiler.

$a$ is pipe connecting B, and runs down into F.

$b$ is connecting pipe from B running down into G near to its bottom.

H is bottom end of case B.

$h$ is a top cap screwed on B.

P is the set screw in H to make joints on end of glass.

$p$ is top end having the pipes $a$ and $b$, connected into it, and forming a joint at the top of the glass by means of gum.

K is the concentric glass that is secured within the top and bottom pieces, O and $p''$ and is secured between gum to make joints, and overcome expansion and contraction.

$i$ is the lower, and inner concentric glass tube which forms the uniform reading scale for steam pressure.

L is glass tube that sits on $i$, in K, and forms outer concentric tube for water indicator and receptacle for mercury with space sufficient between L and K for the passage of the fluid between them.

$j$ is inner and upper concentric glass tube, and is secured to $p''$ by gum tube and runs down near to the bottom of glass L, into the mercury, it having open communications to $b$.

$q$ is gum sleeve or tube connecting pipe $b$ with glass tube $j$.

$v$ is a colored glass float in tube $j$, which shows more clearly the rise or fall of mercury.

*t t* is top screws at the highest point in column or pipes *a* and *b*, to be taken out to allow the column of water to rise and the air to escape.

X X X are gage cocks on the boiler of the usual form.

E red line is the fixed water line and is the highest point which is registered, or desired to be registered, and is called high water line and represents the line or top of mercury column shown in glass L, and is fixed for the level of the connecting pipe E, connecting the top of outer concentric pipe G, with the inner concentric pipe F, and *b*. Pipe *b* has open communication with the interior of L and K, through $p''$, $q$, and $j$, at the bottom of J. *a* has open communication with J through K and L at their tops, and at the bottom of *j*, and through the body of mercury in L. Also there are open communication for the passage of fluid between L and K at their top, and between L and J at their bottom, and between K and *i* at their bottom; a sufficient quantity of mercury must be put into K to fill *i*, and in L, to fill *j*, that being put in before the glasses are put in their places. The reading scales are marked from pressure and test gage.

When the indicator and all its connections are completed and all attachments made with mercury in K and L as shown in Fig. 1, and ready for use then water is put into the boiler in the usual way and tested by the gage cocks to fetch it up to the water line of the boiler at E red line. Where the indicator is elevated above the level, it will be necessary to displace the air by any known means, as water must have a pressure to cause it to rise in the tubes or pipes, and displace the air out of them. After the air is displaced out of the pipes, and water is raised in the tubes or pipes by letting the air escape at the screws *t, t,* or by closing cocks *c* and *d* and filling pipes, from *t, t*. This having been done and all the pipes been filled with water excepting what is desired to be retained in glass *i* to indicate the pressure of steam, and the space above E pipe then the screws *t t* are replaced and made air tight. Then the cocks *c, d*, at the boiler in pipes C and D are opened. The two columns of mercury in L and J will be on a level if the water in the boiler is up to the line E. Then as the water is lowered in the boiler either with steam on, or off the mercury will show the distance, in its scale. As the specific gravity of mercury is to that of water, so is the fall of water in the boiler, and concentric pipe G, to the rise and fall of the mercury column in *j* and L. When steam is raised then the concentric glasses K and *i* by the mercury column, and reading scale will indicate the pressure of steam they having the use, of both legs, and the pressure of the boiler to act in conjunction with the water indicator, this being the same pressure instrument patented to me July 6th 1858.

Thus having shown the manner I have constructed, and the manner in which I operate my improvement in water and steam indicators, I do not claim the mercury cup, containing mercury, nor the glass tube embodied in the leg of the siphon, and showing only the rise or fall of the mercury, by single end of the mercury column, in single tube, as this has been done before, and I do not wish to be understood, as claiming, any such device; but

What I claim, and desire to secure by Letters Patent, is—

1. The manner of constructing, and arranging, the concentric glass tubes, with the connecting pipes, as, and for the purpose, herein set forth.

2. Also the manner, of constructing, and arranging, the connecting pipes, with the boiler, and the branch, or equilibrium pipe, between the two, concentric connecting pipes, at the water line, of the boiler, as, and for the purpose, herein set forth.

WM. C. GRIMES.

Witnesses:
W. P. HIBBARD,
LEWIS GODBON.